(12) United States Patent
Nagami et al.

(10) Patent No.: US 10,263,260 B2
(45) Date of Patent: Apr. 16, 2019

(54) ELECTRODE CATALYST FOR FUEL CELL, METHOD FOR PRODUCING THE SAME, AND POLYMER ELECTROLYTE FUEL CELL USING THE SAME

(71) Applicants: TOYOTA JIDOSHA KABUSHIKI KAISHA, Toyota-shi, Aichi-ken (JP); CATALER CORPORATION, Kakegawa-shi, Shizuoka-ken (JP)

(72) Inventors: Tetsuo Nagami, Nagoya (JP); Sozaburo Ohashi, Nagoya (JP); Mikihiro Kataoka, Toyota (JP); Tomoaki Terada, Kakegawa (JP); Takahiro Nagata, Kakegawa (JP); Yosuke Horiuchi, Kakegawa (JP); Akihiro Hori, Kakegawa (JP)

(73) Assignees: Toyota Jidosha Kabushiki Kaisha, Toyota-shi, Aichi-ken (JP); Cataler Corporation, Kakegawa-shi, Shizuoka-ken (JP)

( * ) Notice: Subject to any disclaimer, the term of this patent is extended or adjusted under 35 U.S.C. 154(b) by 36 days.

(21) Appl. No.: 15/212,787

(22) Filed: Jul. 18, 2016

(65) Prior Publication Data
US 2017/0012295 A1    Jan. 12, 2017

Related U.S. Application Data

(62) Division of application No. 13/379,713, filed as application No. PCT/IB2010/001019 on May 4, 2010, now abandoned.

(30) Foreign Application Priority Data

Jun. 22, 2009    (JP) .................................. 2009-147429

(51) Int. Cl.
    *H01M 4/92*     (2006.01)
    *H01M 4/88*     (2006.01)
    (Continued)

(52) U.S. Cl.
    CPC ......... *H01M 4/926* (2013.01); *H01M 4/8663* (2013.01); *H01M 4/881* (2013.01);
    (Continued)

(58) Field of Classification Search
    None
    See application file for complete search history.

(56) References Cited

U.S. PATENT DOCUMENTS 7,220,693 B1    5/2007   Qi et al.
2005/0233183 A1  10/2005  Hampden-Smith et al.
(Continued)

FOREIGN PATENT DOCUMENTS

CN    1722499 A      1/2006
EP    1 916 728 A1   4/2008
(Continued)

OTHER PUBLICATIONS

International Search Report in International Application No. PCT/IB2010/001019; dated Aug. 9, 2010.
(Continued)

*Primary Examiner* — Jonathan Crepeau
(74) *Attorney, Agent, or Firm* — Finnegan, Henderson, Farabow, Garrett & Dunner, LLP

(57) ABSTRACT

A method for producing an electrode catalyst for a fuel cell is provided. The electrode catalyst includes a carbon support and a catalyst supported on the carbon support. The catalyst is one of platinum and a platinum-alloy. The method includes supporting the catalyst on the carbon support; and treating the carbon support carrying the catalyst with a nitric acid and cleaning the treated carbon support, such that an
(Continued)

RELATIONSHIP BETWEEN CATALYST ACID AMOUNT AND LOW-HUMIDITY EFFICIENCY POINT PERFORMANCE (@0.2A/cm²)

amount of an acid present on the carbon support becomes in a range from 0.7 mmol to 1.31 mmol of the acid per gram of the electrode catalyst.

3 Claims, 2 Drawing Sheets

(51) Int. Cl.
  *H01M 4/86*  (2006.01)
  *H01M 8/1018*  (2016.01)
(52) U.S. Cl.
  CPC ....... *H01M 4/8825* (2013.01); *H01M 4/8842* (2013.01); *H01M 4/8878* (2013.01); *H01M 4/921* (2013.01); *H01M 8/1018* (2013.01); *H01M 2008/1095* (2013.01); *Y02E 60/50* (2013.01)

(56) References Cited

U.S. PATENT DOCUMENTS

| | | | |
|---|---|---|---|
| 2006/0099483 | A1 | 5/2006 | Min et al. |
| 2007/0238001 | A1 | 10/2007 | Koyama |
| 2012/0107724 | A1 | 5/2012 | Nagai |

FOREIGN PATENT DOCUMENTS

| | | | |
|---|---|---|---|
| JP | 2002-289208 | | 10/2002 |
| JP | 2003-317726 | | 11/2003 |
| JP | 2004-025024 | * | 1/2004 |
| JP | 2004-047386 | * | 2/2004 |
| JP | 2004-47386 | | 2/2004 |
| JP | 2004-79420 | | 3/2004 |
| JP | 2005-25947 | | 1/2005 |
| JP | 2005-190887 | | 7/2005 |
| JP | 2006-114229 | | 4/2006 |
| JP | 2006-179412 | | 7/2006 |
| JP | 2008-108502 | | 5/2008 |
| JP | 2008-123744 | | 5/2008 |
| TW | 2004-05608 | | 4/2004 |
| WO | WO 2004/019435 | | 3/2004 |

OTHER PUBLICATIONS

Written Opinion of the International Searching Authority in International Application No. PCT/IB2010/001019; dated Aug. 9, 2010.
Applicant's Response to Written Opinion in International Application No. PCT/IB2010/001019 (dated Aug. 30, 2010).
Notification Concerning Informal Communications with the Applicant in International Application No. PCT/IB2010/001019; dated Jul. 1, 2011.
Applicant's Response to Notification in International Application No. PCT/IB2010/001019 (dated Jul. 25, 2011).
International Preliminary Report on Patentability in International Application No. PCT/IB2010/001019; Completion Date: Aug. 11, 2011.
Notification of Reasons for Refusal in Japanese Patent Application No. 2009-147429; dated Aug. 22, 2011.
Decision for Refusal for JP Appl. No. 2009-147429 dated Jun. 26, 2012.
Machine Translation of JP 2004-079420, dated Mar. 11, 2004.
Machine Translation of JP 2004-047386, dated Feb. 12, 2004.
Office Action dated Mar. 18, 2016 in U.S. Appl. No. 13/379,713.
Advisory Action dated Feb. 17, 2016 in U.S. Appl. No. 13/379,713.
Office Action dated Nov. 9, 2015 in U.S. Appl. No. 13/379,713.
Office Action dated May 7, 2015 in U.S. Appl. No. 13/379,713.
Office Action dated Dec. 29, 2014, in U.S. Appl. No. 13/379,713.
Office Action dated Jun. 2, 2014 in U.S. Appl. No. 13/379,713.
Office Action dated Feb. 27, 2014 in U.S. Appl. No. 13/379,713.

* cited by examiner

RELATIONSHIP BETWEEN CATALYST ACID AMOUNT AND
LOW-HUMIDITY EFFICIENCY POINT PERFORMANCE
(@0.2A/cm$^2$)

RELATIONSHIP BETWEEN CATALYST ACID AMOUNT AND
LOW-HUMIDITY OUTPUT POINT PERFORMANCE
(@1.02A/cm$^2$)

ELECTRODE CATALYST FOR FUEL CELL, METHOD FOR PRODUCING THE SAME, AND POLYMER ELECTROLYTE FUEL CELL USING THE SAME

CROSS-REFERENCE TO RELATED APPLICATIONS

This is a division of application Ser. No. 13/379,713, filed Dec. 21, 2011, which is a national phase application of International Application No. PCT/IB2010/001019, filed May 4, 2010, and claims the priority of Japanese Application No. 2009-147429, filed Jun. 22, 2009, the contents of all of which are incorporated herein by reference.

BACKGROUND OF THE INVENTION

1. Field of the Invention

The invention relates to an electrode catalyst for a fuel cell, a method for producing the electrode catalyst, and a polymer electrolyte fuel cell using the electrode catalyst, which are developed so as to improve the performance of a platinum catalyst or platinum-alloy catalyst.

2. Description of the Related Art

The cell characteristics of polymer electrolyte fuel cells have remarkably improved for some reasons including the following reasons: 1) polymer electrolyte membranes having a high ion conductivity have been developed, and 2) catalyst-carrying carbon that is coated with a polymer electrolyte of the same type as or a different type from the polymer electrolyte membrane is used as a material that forms an electrode catalyst layer, so that three-dimensional reaction sites are provided in the catalyst layer. The polymer electrolyte fuel cells, which exhibit the improved cell performance, can be easily made compact and lightweight; therefore, it has been expected to put the polymer electrolyte fuel cells to practical use in mobile vehicles, such as electric automobiles, or as a power source of a compact cogeneration system, for example.

Generally, a gas-diffusible electrode used in a polymer electrolyte fuel cell consists of a catalyst layer containing the catalyst-carrying carbon coated with the polymer electrolyte as described above, and a gas diffusion layer that supplies reaction gas to the catalyst layer and collects electrons. In the catalyst layer, porous portions are present in which micropores are formed among secondary particles or tertiary particles of carbon as a constituent material of the catalyst layer, and the porous portions function as diffusion channels for the reaction gas. A catalyst formed of a noble metal, such as platinum or platinum alloy, which is stable in the polymer electrolyte is generally used as the above-mentioned catalyst.

For example, a catalyst having a noble metal, such as platinum or platinum alloy, supported on carbon black has been used as cathode and anode catalysts (electrode catalysts) of polymer electrolyte fuel cells. Generally, the platinum-carrying carbon black is prepared by adding sodium hydrogen sulfite to an aqueous acidic platinum-chloride solution, which is then caused to react with hydrogen peroxide to form platinum colloid, supporting the platinum colloid on carbon black, cleaning, and then subjecting the platinum-carrying carbon black to heat treatment as needed.

Platinum, which is an expensive noble metal, has been desired to exhibit sufficient performance even where a small amount of platinum is carried on a carbon support. Therefore, technologies for enhancing the catalyst activity with a reduced amount of platinum used have been studied. For example, an electrode catalyst for fuel cells as disclosed in Japanese Patent Application Publication 2002-289208 (JP-A-2002-289208) is composed of an electrically conductive carbon material, metal particles that are supported on the conductive carbon material and are less likely be oxidized than platinum under acidic conditions, and platinum that covers outer surfaces of the metal particles. The thus formed electrode catalyst has high durability, and the growth of platinum particles during operation of the fuel cell is suppressed or restricted. More specifically, examples of the metal particles include, for example, alloys comprised of platinum and at least one metal selected from gold, chromium, iron, nickel, cobalt, titanium, vanadium, copper, and manganese.

In order to improve the utilization factor of noble metal and reduce the amount of noble metal used so as to reduce the cost of manufacture of electrode catalysts, an electrode catalyst as disclosed in Japanese Patent Application Publication No. 2005-25947 (JP-A-2005-25947) is prepared by subjecting highly dispersed carbon having a highly complex structure and a low specific surface area to a process selected from an activation process, oxidation process using nitric acid, a process for making the carbon hydrophilic, and a hydroxyl addition process, so as to activate the surface of the carbon, and then depositing metal on the carbon.

However, the platinum catalyst or platinum-alloy catalyst of the related art is still insufficient in terms of the oxygen reduction capability, and it has been desired to develop higher-performance catalysts.

SUMMARY OF THE INVENTION

The invention provides an electrode catalyst for a fuel cell, which offers higher performance than the platinum catalyst or platinum-alloy catalyst of the related art, a method for producing the electrode catalyst, and a polymer electrolyte fuel cell using the electrode catalyst.

A first aspect of the invention is concerned with an electrode catalyst for a fuel cell, which includes: a carbon support, a platinum catalyst or a platinum-alloy catalyst supported on the carbon support, and at least 0.7 mmol of an acid per gram of the electrode catalyst, which is present on the carbon support.

To form the electrode catalyst as described above, an acid treatment is conducted on the carbon support carrying platinum or platinum alloy, so that 0.7 mmol/g or more of acid per gram of the catalyst remains on the carbon support. As a result, the catalyst becomes hydrophilic, and the water-hold property around the catalyst is improved, resulting in a reduction in the resistance to proton shift in the catalyst layer, and improved power generation performance at low humidity.

In the electrode catalyst according to the first aspect of the invention, the platinum-alloy catalyst may consist of an alloy of platinum and at least one metal selected from ruthenium, molybdenum, osmium, cobalt, rhodium, iridium, iron, nickel, titanium, tungsten, palladium, rhenium, chromium, manganese, niobium, and tantalum.

In the electrode catalyst according to the first aspect of the invention, the carbon support on which the acid is present and the platinum catalyst or the platinum-alloy catalyst is supported may be hydrophilic.

In the electrode catalyst according to first aspect of the invention, the acid may be present on the carbon support in an amount equal to or greater than 1.0 mmol per gram of the electrode catalyst, or may be present on the carbon support in an amount equal to or greater than 1.31 mmol per gram of the electrode catalyst.

A second aspect of the invention is concerned with a method for producing an electrode catalyst for a fuel cell, which comprises a carbon support and a platinum catalyst or a platinum-alloy catalyst supported on the carbon support. The method includes the steps of: supporting the platinum catalyst or the platinum-alloy catalyst on the carbon support, and treating the carbon support carrying the platinum catalyst or the platinum-alloy catalyst with an acid, so that at least 0.7 mmol of the acid per gram of the electrode catalyst is present on the carbon support treated with the acid.

In the method according to the second aspect of the invention, after the carbon support carrying the platinum catalyst or the platinum-alloy catalyst is treated with the acid, the carbon support carrying the platinum catalyst or the platinum-alloy catalyst and treated with the acid may be cleaned.

In the method according to the second aspect of the invention, the platinum-alloy catalyst may consist of an alloy of platinum and at least one metal selected from ruthenium, molybdenum, osmium, cobalt, rhodium, iridium, iron, nickel, titanium, tungsten, palladium, rhenium, chromium, manganese, niobium, and tantalum.

In the method according to the second aspect of the invention, the carbon support on which the acid is present and the platinum catalyst or the platinum-alloy catalyst is supported may be hydrophilic.

In the method according to the second aspect of the invention, the acid may be present on the carbon support in an amount equal to or greater than 1.0 mmol per gram of the electrode catalyst, or may be present on the carbon support in an amount equal to or greater than 1.31 mmol per gram of the electrode catalyst.

A third aspect of the invention is concerned with a polymer electrolyte fuel cell including the electrode catalyst according to the first aspect of the invention.

BRIEF DESCRIPTION OF THE DRAWINGS

The foregoing and further objects, features and advantages of the invention will become apparent from the following description of example embodiments with reference to the accompanying drawings, wherein.

DETAILED DESCRIPTION OF EMBODIMENTS

Figure 1:
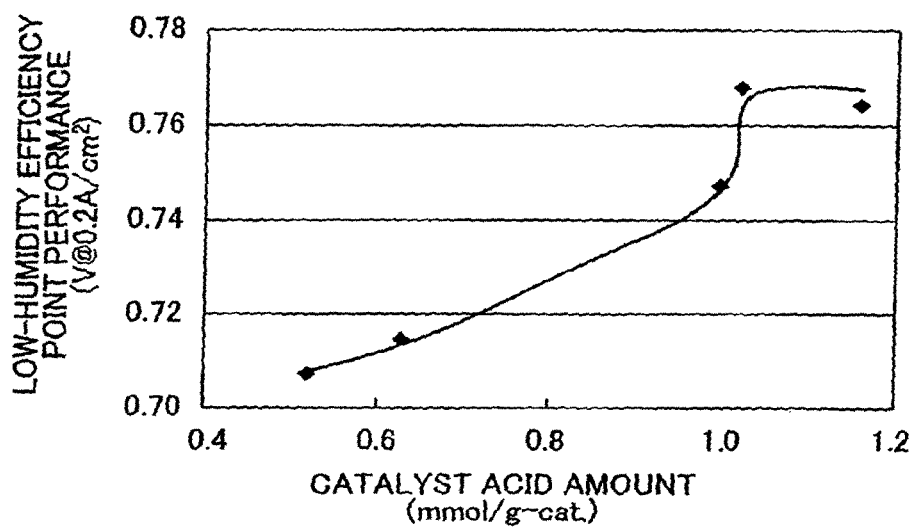
FIG. 1 is a graph showing the relationship between the catalyst acid amount and the low-humidity efficiency point performance (at 0.2 A/cm$^2$) with regard to Examples 1, 2 and Comparative Examples 1-3.

The inventors reached the present invention by subjecting carbon carrying a platinum catalyst or platinum-alloy catalyst to a particular treatment so as to bring it into a particular carbon state.

In the following, some examples of this invention and comparative examples will be described in detail. A process for producing a single cell used for evaluation, a method of evaluating the performance of a catalyst of each example, and a method of determining the amount of acid in the catalyst will be described below.

The process for producing a single cell used for evaluation will be described. A single cell for use in a polymer electrolyte fuel cell was formed in the following manner, using a catalyst powder obtained in each example or comparative example. The catalyst powder was dispersed in an organic solvent, and the resulting dispersion liquid was applied by coating to a Teflon sheet to form catalyst layers (i.e., electrodes). The amount of Pt catalyst per 1 cm$^2$ of electrode area was 0.4 mg. The electrodes formed from the catalyst powder were attached to each other via a polymer electrolyte membrane by hot press, to provide a membrane-electrode assembly, and diffusion layers were mounted on the opposite sides of the membrane-electrode assembly, to form a single-cell electrode.

The method of evaluating the catalyst performance will be described. To evaluate the catalyst performance, the initial voltage measurement was conducted in the following manner. The temperature of the single cell was set to 80° C., and moisturized air that passed a bubbler heated to 60° C. was supplied to the cathode-side electrode at a rate of 2.0 L/min, while moisturized hydrogen that passed a bubbler heated to 60° C. was supplied to the anode-side electrode at a rate of 0.5 L/min. In this condition, current voltage characteristics were measured. Comparisons of the performance among the catalysts of the respective examples were made through measurements of voltage values at current densities of 0.2 A/cm$^2$ and 1.0 A/cm$^2$.

The method of determining the acid amount in the catalyst will be described. After 0.5 g of catalyst was added to 20 ml of 0.1N sodium hydroxide, which was then ultrasonically stirred for 20 min., the resulting liquid was subjected to filtration. Then, 0.05 ml of Methyl Orange as an indicator was added to 5 ml of filtrate while it was being stirred, and titration was conducted with 0.05N hydrochloric acid.

Example 1 will be described. Initially, 4.2 g of Ketjen EC (manufactured by Ketjen Black International Company, JAPAN), which is commercially available, and 5.0 g of platinum were added to and dispersed in 0.5 L of pure water. About 100 mL of 0.1N ammonia was then added to the resulting liquid to make PH equal to about 10, so that a hydroxide was formed and deposited on carbon. The resulting dispersion liquid was subjected to filtration, and the obtained powder was dried at 100° C. in a vacuum for 10 hours. Then, the powder was held at 400° C. for 2 hours in hydrogen gas so as to be reduced, and then held at 1000° C. for 10 hours in nitrogen gas so as to provide a catalyst powder. The obtained catalyst was thrown into 1 L of 0.5N nitric acid, heated to 80° C., and was stirred for 30 min. Then, the catalyst was isolated by filtration, and was dried in a blowing drier at 80° C. for 15 hours or longer, to provide a catalyst powder. The acid amount in the catalyst was measured, and the result of the measurement was 1.020 mmol/g-cat.

Example 2 will be described. A catalyst powder as Example 2 was obtained by preparing a catalyst in the same manner as in Example 1, except that, after the catalyst powder was treated with the acid, it was dried in a vacuum drier at 60° C. for 15 hours or longer. The amount of acid in the catalyst was 1.156 mmol/g-cat.

Comparative Example 1 will be described. A catalyst powder as Comparative Example 1 was obtained by preparing a catalyst in the same manner as in Example 1, except that the acid treatment (i.e., a process of treating the catalyst powder with an acid) was not conducted. The amount of acid in the catalyst was 0.52 mmol/g-cat.

Comparative Example 2 will be described. A catalyst powder as Comparative Example 2 was obtained by preparing a catalyst in the same manner as in Example 1, except that, after the acid treatment was conducted, the catalyst was filtered and cleaned with 1 L of pure water, and the filtration and cleaning were repeated until the conductivity of drainage or waste liquid became equal to or lower than 20 µS/cm. The amount of acid in the catalyst was 0.628 mmol/g-cat.

Comparative Example 3 will be described. A catalyst power as Comparative Example 3 was obtained by preparing a catalyst in the same manner as in Example 1, except that, after the acid treatment was conducted, the catalyst was filtered and cleaned with 1 L of pure water only once. The amount of acid in the catalyst was 0.996 mmol/g-cat.

Figure 2:
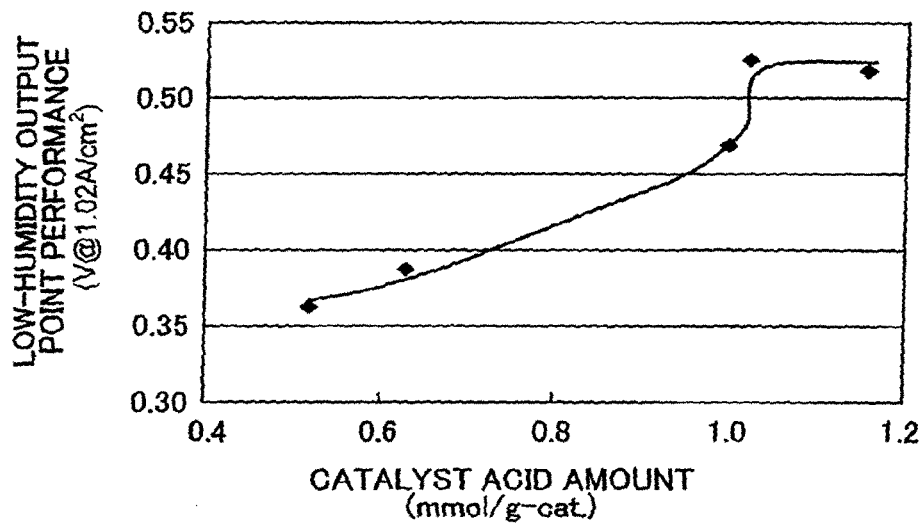
FIG. 2 is a graph showing the relationship between the catalyst acid amount and the low-humidity output point performance (at 1.02 A/cm$^2$) with regard to Examples 1, 2 and Comparative Examples 1-3.

FIG. 1 shows the relationship between the catalyst acid amount and the low-humidity efficiency point performance (at 0.2 A/cm$^2$) with regard to Examples 1, 2 and Comparative Examples 1-3 as described above. FIG. 2 shows the relationship between the catalyst acid amount and the low-humidity output point performance (at 1.02 A/cm$^2$) with regard to Examples 1, 2 and Comparative Examples 1-3.

As is understood from FIG. 1 and FIG. 2, Examples of the invention showed high voltage values at both of the current densities, 0.2 A/cm$^2$ and 1.02 A/cm$^2$, since the catalysts of these Examples had an acid that can be hydrophilic. On the other hand, Comparative Examples showed low voltage values at both of the current densities, 0.2 A/cm$^2$ and 1.02 A/cm$^2$. It is concluded from these results that the catalyst becomes hydrophilic when it contains an acid that can be hydrophilic, and the water-hold property around the catalyst is improved, resulting in a reduction in the resistance to proton shift in the catalyst layer.

Comparative Example 4 will be described. Initially, 4.71 g of a commercially available carbon powder having a high specific surface area was added to and dispersed in 0.5 L of pure water, to provide a dispersion liquid. A hexahydroxo platinum nitric acid solution containing 4.71 g of platinum and an aqueous solution of cobalt nitrate containing 0.592 g of cobalt were dropped in this order into the dispersion liquid, to be sufficiently brought into contact with carbon. Then, about 5 mL of 0.01N ammonia was added to the resulting liquid to make PH equal to about 9, so that a hydroxide was formed and deposited on the carbon. The resulting dispersion liquid was repeatedly filtered and cleaned until the conductivity of filtration drainage became equal to or lower than 50 µS/cm, and the obtained powder was dried in a vacuum at 100° C. for 10 hours. Then, after the dried powder was held in hydrogen gas at 500° C. for 2 hours so as to be reduced, it was held in nitrogen gas at 700° C. for 0.5 hour and held in the same gas at 600° C. for 6 hours, to provide an alloy of platinum and cobalt.

Furthermore, the catalyst powder was thrown into 0.5 L of 0.5N nitric acid, heated to 80° C., and was stirred for 30 min, so that cobalt that had not been alloyed was removed by acid cleaning. Then, the catalyst was filtered and cleaned with 1 L of pure water, and the filtration and cleaning were repeated until the conductivity of the cleaning drainage became equal to or lower than 20 µS/cm. Then, the catalyst was isolated by filtration, and was dried in a vacuum drier at 100° C. for 12 hours or longer, to provide a catalyst powder as Comparative Example 4.

Comparative Example 5 will be described. A catalyst powder as Comparative Example 5 was obtained in the same manner as in Comparative Example 4, except that, after the reduction process, the catalyst powder was held in nitrogen gas at 700° C. for 0.5 hour and held in the same gas at 600° C. for 12 hours, to provide an alloy of platinum and cobalt.

Comparative Example 6 will be described. A catalyst powder as Comparative Example 6 was obtained in the same manner as in Comparative Example 4, except that, after the reduction process, the catalyst powder was held in nitrogen gas at 700° C. for 0.5 hour and held in the same gas at 600° C. for 18 hours, to provide an alloy of platinum and cobalt.

Comparative Example 7 will be described. A catalyst powder as Comparative Example 7 was obtained in the same manner as in Comparative Example 4, except that, after the reduction process, the catalyst powder was held in nitrogen gas at 700° C. for 6.5 hours, to provide an alloy of platinum and cobalt.

Comparative Example 8 will be described. A catalyst powder as Comparative Example 8 was obtained in the same manner as in Comparative Example 4, except that, after the reduction process, the catalyst powder was held in nitrogen gas at 800° C. for 6.5 hours, to provide an alloy of platinum and cobalt.

Comparative Example 9 will be described. A catalyst powder as Comparative Example 9 was obtained in the same manner as in Comparative Example 4, except that, after the reduction process, the catalyst powder was held in nitrogen gas at 700° C. for 0.5 hour, to provide an alloy of platinum and cobalt.

Comparative Example 10 will be described. A catalyst powder as Comparative Example 10 was obtained in the same manner as in Comparative Example 4, except for the following steps. In Comparative Example 10, after the reduction process, the catalyst powder was held in nitrogen gas at 700° C. for 0.5 hour, to provide an alloy of platinum and cobalt. Furthermore, the catalyst powder was thrown into 0.5 L of 0.5N nitric acid, heated to 80° C., and was stirred for 30 min, so that cobalt that had not been alloyed was removed by acid cleaning. Then, in Comparative Example 10, the catalyst was isolated by filtration but not cleaned with pure water, and was dried in a vacuum drier at 100° C. for 12 hours or longer.

Comparative Example 11 will be described. A catalyst powder as Comparative Example 11 was obtained in the same manner as in Comparative Example 4, except for the following steps. In Comparative Example 11, after the reduction process, the catalyst powder was held in nitrogen gas at 700° C. for 0.5 hour, to provide an alloy of platinum and cobalt. Furthermore, the catalyst powder was thrown into 0.5 L of 0.5N nitric acid, heated to 80° C., and was stirred for 30 min, so that cobalt that had not been alloyed was removed by acid cleaning. Then, in Comparative Example 11, the catalyst was isolated by filtration but not cleaned with pure water, and was dried in a blowing drier at 80° C. for 12 hours or longer.

Example 3 will be described. A catalyst powder as Example 3 was obtained in the same manner as in Comparative Example 4, except that, after the alloying process, the catalyst powder was thrown into 0.5 L of 2N nitric acid, heated to 80° C., and was stirred for 30 min, so that cobalt that had not been alloyed was removed by acid cleaning. Then, in Example 3, the catalyst was isolated by filtration but not cleaned with pure water, and was dried in a vacuum drier at 100° C. for 12 hours or longer.

Example 4 will be described. A catalyst powder as Example 4 was obtained in the same manner as in Comparative Example 4, except for the following steps. In Example 4, after the alloying process, the catalyst powder was thrown into 0.5 L of 2N nitric acid, heated to 80° C., and was stirred for 30 min, so that cobalt that had not been alloyed was removed by acid cleaning. Then, the catalyst was filtered and cleaned with 1 L of pure water, and the filtration and cleaning were repeatedly conducted until the conductivity of the cleaning drainage became equal to or lower than 20 μS/cm. The catalyst was isolated by filtration, and was further thrown into 0.5 L of 0.5N nitric acid and stirred for 30 min at room temperature. Thereafter, the catalyst was isolated by filtration but not cleaned with pure water, and was dried in a vacuum drier at 100° C. for 12 hours or longer.

Example 5 will be described. A catalyst powder as Example 5 was obtained in the same manner as in Comparative Example 4, except for the following steps. In Example 5, after the alloying process, the catalyst powder was thrown into 0.5 L of 2N nitric acid, heated to 80° C., and was stirred for 30 min, so that cobalt that had not been alloyed was removed by acid cleaning. Then, the catalyst was filtered and cleaned with 1 L of pure water, and the filtration and cleaning were repeatedly conducted until the conductivity of the cleaning drainage became equal to or lower than 20 μS/cm. The catalyst was isolated by filtration, and was further thrown into 0.5 L of 0.5N nitric acid and stirred for 30 min at room temperature. Thereafter, the catalyst was isolated by filtration but not cleaned with pure water, and was dried in a blowing drier at 80° C. for 12 hours or longer.

Example 6 will be described. A catalyst powder as Example 6 was obtained in the same manner as in Comparative Example 4, except that, after the reduction process, the catalyst powder was held in nitrogen gas at 700° C. for 0.5 hour, to provide an alloy of platinum and cobalt, and the catalyst powder was thrown into 0.5 L of 0.5N nitric acid, heated to 80° C., and was stirred for 48 hours, so that cobalt that had not been alloyed was removed by acid cleaning.

Comparative Example 12 will be described. A catalyst powder as Comparative Example 12 was obtained in the same manner as in Comparative Example 4, except that, after the reduction process, the catalyst powder was held in nitrogen gas at 800° C. for 0.5 hour, to provide an alloy of platinum and cobalt.

Comparative Example 13 will be described. A catalyst powder as Comparative Example 13 was obtained in the same manner as in Comparative Example 4, except that, after the reduction process, the catalyst powder was held in nitrogen gas at 700° C. for 0.05 hour, to provide an alloy of platinum and cobalt.

Example 7 will be described. A catalyst powder as Example 7 was obtained in the same manner as in Comparative Example 4, except that, after the reduction process, the catalyst powder was held in nitrogen gas at 800° C. for 0.5 hour, to provide an alloy of platinum and cobalt, and that the catalyst powder was thrown into 0.5 L of 0.5N nitric acid, heated to 80° C., and was stirred for 48 hours, so that cobalt that had not been alloyed was removed by acid cleaning.

Comparative Example 14 will be described. A catalyst powder as Comparative Example 14 was obtained in the same manner as in Comparative Example 4, except that, after the reduction process, the catalyst powder was held in nitrogen gas at 800° C. for 0.5 hour, to provide an alloy of platinum and cobalt, and the catalyst powder was thrown into 0.5 L of 0.05N nitric acid, heated to 80° C., and was stirred for 48 hours, so that cobalt that had not been alloyed was removed by acid cleaning.

Figure 3:
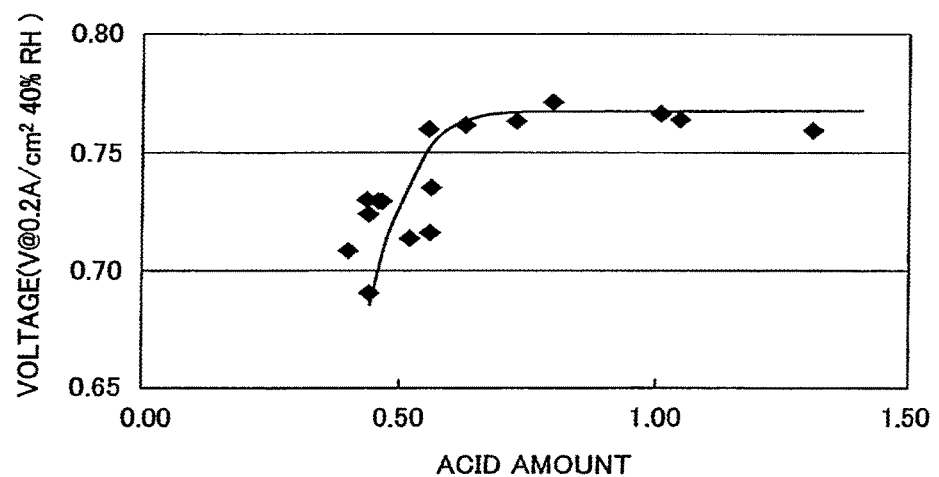
FIG. 3 is a graph showing the relationship between the catalyst acid amount and the low-humidity efficiency point performance (at 0.2 A/cm$^2$) with regard to Examples 3-7 and Comparative Examples 4-14.
Figure 4:
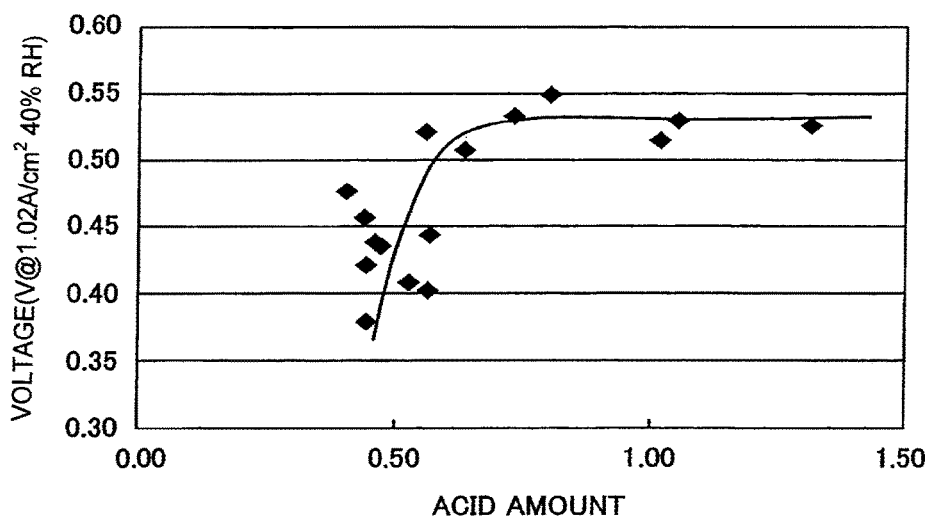
FIG. 4 is a graph showing the relationship between the catalyst acid amount and the low-humidity output point performance (at 1.02 A/cm$^2$) with regard to Examples 3-7 and Comparative Examples 4-14.

TABLE 1 below shows, in list form, the remaining acid amount and the power generation performance with regard to Examples 3-7 and Comparative Examples 4-14. FIG. 3 shows the relationship between the amount of acid in the catalyst and the low-humidity efficiency point performance (at 0.2 A/cm$^2$), with regard to Examples 3-7 and Comparative Examples 4-14. FIG. 4 shows the relationship between the amount of acid in the catalyst and the low-humidity output point performance (at 1.02 A/cm$^2$), with regard to Examples 3-7 and Comparative Examples 4-14.

TABLE 1

| Catalyst Powder | Initial Cell Performance Low Humidity (Both Electrodes RH = 40) | | |
|---|---|---|---|
| | Acid Amount by Back Titration mmol/g | Efficiency-point Voltage at 0.2 A/cm$^2$(V) | Output-point Voltage at 1.0 A/cm$^2$(V) |
| Com. Ex. 4 | 0.40 | 0.708 | 0.476 |
| Com. Ex. 5 | 0.56 | 0.716 | 0.402 |
| Com. Ex. 6 | 0.52 | 0.713 | 0.408 |
| Com. Ex. 7 | 0.44 | 0.724 | 0.421 |
| Com. Ex. 8 | 0.44 | 0.690 | 0.378 |
| Com. Ex. 9 | 0.47 | 0.729 | 0.436 |
| Com. Ex. 10 | 0.56 | 0.735 | 0.444 |
| Com. Ex. 11 | 0.63 | 0.761 | 0.508 |
| Example 3 | 1.01 | 0.765 | 0.514 |
| Example 4 | 1.05 | 0.764 | 0.528 |
| Example 5 | 1.31 | 0.758 | 0.525 |
| Example 6 | 0.80 | 0.772 | 0.548 |
| Com. Ex. 12 | 0.43 | 0.730 | 0.457 |
| Com. Ex. 13 | 0.46 | 0.729 | 0.438 |
| Example 7 | 0.73 | 0.763 | 0.532 |
| Com. Ex. 14 | 0.55 | 0.760 | 0.521 |

As is understood from FIG. 3 and FIG. 4, the platinum-alloy catalysts (Examples 3-7) according to the invention showed high voltage values at both of the current densities, 0.2 A/cm$^2$ and 1.02 A/cm$^2$, since the catalysts of these examples had an acid that can be hydrophilic. On the other hand, Comparative Examples showed low voltage values at both of the current densities, 0.2 A/cm$^2$ and 1.02 A/cm$^2$. It is concluded from these results that the catalyst becomes hydrophilic when it contains an acid that can be hydrophilic, and the water-hold property around the catalyst is improved, resulting in a reduction in the resistance to proton shift in the catalyst layer.

In practicing the present invention, carbon carrying a known platinum catalyst or known platinum-alloy catalyst may be used. Also, in practicing the present invention, various types of acids may be used in an acid treatment performed on the platinum or platinum-alloy carrying carbon, and nitric acid may be preferably used.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The electrode catalyst for fuel cells according to the invention has a higher activity than the platinum catalyst or platinum-alloy catalyst of the related art, thus making it possible to reduce the amount of expensive platinum used in the catalyst.

The invention claimed is:

1. A method for producing an electrode catalyst for a fuel cell, the electrode catalyst including a carbon support; and a catalyst supported on the carbon support, wherein the catalyst is one of platinum and a platinum-alloy, the method comprising:

supporting the catalyst on the carbon support; and treating the carbon support carrying the catalyst with a nitric acid and cleaning the treated carbon support, such that an amount of the nitric acid present on the carbon support becomes in a range from 0.7 mmol of the acid per gram of the electrode catalyst to 1.31 mmol of the acid per gram of the electrode catalyst when the catalyst is a platinum-alloy, or such that an amount of the nitric acid present on the carbon support becomes in a range of 1.0 mmol of the acid per grain of the electrode catalyst to 1.31 mmol of the acid per grain of the electrode catalyst when the catalyst is platinum.

2. The method according to claim 1, wherein the platinum-alloy comprises an alloy of platinum and at least one metal selected from ruthenium, molybdenum, osmium, cobalt, rhodium, iridium, iron nickel, titanium, tungsten, palladium, rhenium, chromium, manganese, niobium, and tantalum.

3. The method of claim 1, wherein the carbon support on which the nitric acid is present and the catalyst is supported is hydrophilic.

* * * * *